United States Patent
Eguchi

(10) Patent No.: US 8,533,950 B2
(45) Date of Patent: Sep. 17, 2013

(54) METHOD OF MANUFACTURING HOLDING AND SEALING MATERIAL

(75) Inventor: Masayuki Eguchi, Takahama (JP)

(73) Assignee: Ibiden Co., Ltd., Ogaki-shi (JP)

( * ) Notice: Subject to any disclaimer, the term of this patent is extended or adjusted under 35 U.S.C. 154(b) by 379 days.

(21) Appl. No.: 12/257,459

(22) Filed: Oct. 24, 2008

(65) Prior Publication Data

US 2009/0049690 A1 Feb. 26, 2009

Related U.S. Application Data

(62) Division of application No. 11/444,484, filed on Jun. 1, 2006, now abandoned.

(30) Foreign Application Priority Data

Jun. 10, 2005 (JP) ................................. 2005-171221

(51) Int. Cl.
*B21D 51/16* (2006.01)
*B01D 50/00* (2006.01)
*D21H 13/00* (2006.01)
*B32B 5/02* (2006.01)

(52) U.S. Cl.
USPC .................... 29/890; 422/180; 428/311.51

(58) Field of Classification Search
USPC ............ 29/890, 896.62; 428/311.11, 311.51; 442/179, 180, 172, 178; 422/179, 180, 172, 422/178
See application file for complete search history.

(56) References Cited

U.S. PATENT DOCUMENTS

| | | | | |
|---|---|---|---|---|
| 4,230,573 | A | * | 10/1980 | Kilty et al. ................. 210/767 |
| 5,212,130 | A | * | 5/1993 | Addiego et al. ............ 502/60 |
| 5,996,228 | A | * | 12/1999 | Shoji et al. ................ 29/890 |
| 7,575,727 | B2 | | 8/2009 | Fukushima |
| 2003/0049180 | A1 | | 3/2003 | Fukushima |
| 2003/0104189 | A1 | | 6/2003 | Agata |
| 2004/0052694 | A1 | | 3/2004 | Nishikawa et al. |
| 2004/0234428 | A1 | | 11/2004 | Tanahashi et al. |
| 2007/0207069 | A1 | | 9/2007 | Kariya et al. |
| 2007/0231222 | A1 | | 10/2007 | Okabe |

(Continued)

FOREIGN PATENT DOCUMENTS

| EP | 0 835 368 B1 | 4/1998 |
|---|---|---|
| EP | 1 182 333 A1 | 2/2002 |

(Continued)

OTHER PUBLICATIONS

Online Definition for "Latex".*

(Continued)

*Primary Examiner* — Sarang Afzali
(74) *Attorney, Agent, or Firm* — Oblon, Spivak, McClelland, Maier & Neustadt, L.L.P.

(57) ABSTRACT

The present invention relates to a holding and sealing material 2 set between a catalyst carrier 1 and a shell 95 which covering the outside of the catalyst carrier 1 in a catalytic converter for purifying an exhaust gas and manufacturing method thereof. An organic binder 22 on the holding and sealing material 2 has the glass transition point Tg (° c) of less than or equal to approximately 5° C. In addition, an infiltrating step and a drying step are conducted during the manufacturing. In the infiltrating step, the mat-like material is infiltrated with emulsion containing the organic binder. In the drying step, the mat-like material containing the emulsion is dried.

18 Claims, 5 Drawing Sheets

(56) References Cited

U.S. PATENT DOCUMENTS

| | | |
|---|---|---|
| 2007/0292318 A1 | 12/2007 | Andoh et al. |
| 2008/0044317 A1 | 2/2008 | Kariya et al. |
| 2008/0047638 A1 | 2/2008 | Sugino |
| 2008/0178566 A1 | 7/2008 | Okabe |
| 2008/0181831 A1 | 7/2008 | Okabe |
| 2008/0312071 A1 | 12/2008 | Nishikawa et al. |
| 2009/0072498 A1 | 3/2009 | Tanahashi et al. |
| 2009/0075812 A1 | 3/2009 | Tanahashi et al. |
| 2009/0081442 A1 | 3/2009 | Tanahashi et al. |
| 2009/0081455 A1 | 3/2009 | Mitani |
| 2009/0084268 A1 | 4/2009 | Saiki |
| 2009/0087352 A1 | 4/2009 | Okabe |
| 2009/0087353 A1 | 4/2009 | Saiki |
| 2009/0114097 A1 | 5/2009 | Saiki |

FOREIGN PATENT DOCUMENTS

| | | |
|---|---|---|
| EP | 1 267 048 A1 | 12/2002 |
| EP | 1 296 030 A1 | 3/2003 |
| JP | 2001-27117 A | 1/2001 |
| JP | 2002-302859 A | 10/2002 |
| JP | 2002-302875 A | 10/2002 |
| JP | 2003-105658 | 4/2003 |
| JP | 2006-223920 A | 8/2006 |
| WO | WO 00/33946 | 6/2000 |

OTHER PUBLICATIONS

U.S. Appl. No. 12/273,947, filed Nov. 19, 2008, Tanahashi et al.

U.S. Appl. No. 12/256,630.

U.S. Appl. No. 12/240,797.

U.S. Appl. No. 12/327,454.

Yasunari Sugyo, et al., "A Heat Resistant Mat and Its Manufacturing Method, and an Enzyme Converter for Purifying Exhaust Gas", Schreiber Translation, Inc., Nov. 2008, 21 pages.

U.S. Appl. No. 12/413,044.

Notification of Reasons for Refusal issued Aug. 12, 2010, in Japan Patent Application No. 2005-171221.

\* cited by examiner (A)

(B)

METHOD OF MANUFACTURING HOLDING AND SEALING MATERIAL

CROSS-REFERENCES TO RELATED APPLICATIONS

The application is a divisional of and claims the benefit of priority under 35 U.S.C. §120 from U.S. Ser. No. 11/444,484, filed Jun. 1, 2006, and claims the benefit of priority under 35 U.S.C. §119 from Japanese Patent Application No. 2005-171221, filed Jun. 10, 2005, entitled "HOLDING AND SEALING MATERIAL AND MANUFACTURING METHOD THEREOF". The contents of this application are incorporated herein by reference in their entirety.

BACKGROUND OF THE INVENTION

1. Field of the Invention

The present invention relates to a holding and sealing material of a catalytic converter for purifying an exhaust gas discharged from an internal combustion engine or the like.

2. Discussion of the Background

As shown in FIG. 5, conventionally, a catalytic converter 90 for purifying an exhaust gas has been used for purifying an exhaust gas discharged from an internal combustion engine 92 or the like. The catalytic converter 90 has a catalyst carrier 1, a shell 95 made of metal and covering the outside of the catalyst carrier, and a holding and sealing material 91 which is set between the both. The holding and sealing material 91 can prevent the exhaust gas from leaking out from between the catalyst carrier 1 and the shell 95, and also, it can prevent the catalyst carrier 1 from damage in contact with the shell 95.

At a time of manufacturing the catalytic converter 90, the holding and sealing material 91 is wound around the catalyst carrier 1, and the wound unit is set within the shell 95. Then, an inlet connection 97 and an outlet connection 98 are respectively connected to both ends of the shell 95 by welding. The catalytic converter 90 manufactured in the manner mentioned above is set in the middle of a pipe 99 for an exhaust gas discharged from the engine 92.

As the holding and sealing material 91, the material made by infiltrating a mat-like material 911 made of alumina-silica based ceramic fibers (inorganic fibers) or the like with an organic binder 912 has been used. Because the holding and sealing material 91 is an aggregate of filaments and its specific gravity is small, there is a risk that a part of the inorganic fibers flies in all directions in the air from a surface of the holding and sealing material 91 at a time of manufacturing the catalytic converter 90 by mounting the holding and sealing material 91 in the catalyst carrier 1 and the shell 95. Therefore, there is a risk of deteriorating a working environment of a working area for the mounting work, and it is necessary for a worker to work with wearing an antidust mask or the like.

For the prevention of the inorganic fibers flying, alumina fibers aggregate whose average fiber diameter and minimum fiber diameter are controlled to specific range has been developed so far (refer to Patent document 1). When the alumina fibers aggregate is assembled to the catalyst carrier 1 and the shell 95 as the holding and sealing material 91, it is possible to reduce a flying amount of inorganic fibers (alumina).

However, it was impossible to adequately reduce a flying amount of inorganic fibers even by a conventional holding and sealing material whose fiber diameter is controlled. Therefore, there is a risk that a part of the inorganic fibers flies in all directions in the air while at work and a working environment is deteriorated.

[Patent document 1] JP 2003-105658 Unexamined Patent Publication (Kokai)

SUMMARY OF THE INVENTION

According to a preferred embodiment first aspect of the present invention, there is provided a manufacturing method of a holding and sealing material which is configured to be set between a catalyst carrier and a shell covering the outside of the catalyst carrier in a catalytic converter for purifying an exhaust gas comprising:

a infiltrating step for infiltrating a mat-like material formed by arranging inorganic fibers in a mat shape with emulsion made by dispersing a organic binder into water; and a drying step for attaching the organic binder to the mat-like material by means of drying the mat-like material containing the emulsion and obtaining the holding and sealing material, wherein the organic binder has a glass transition point Tg (° c) of less than or equal to approximately 5° C.

In the manufacturing method of the holding and sealing material of the preferred embodiment of the present invention, the infiltrating step and the drying step are conducted as described above.

In the infiltrating step, the mat-like material formed by arranging inorganic fibers in a mat shape is infiltrated with emulsion made by dispersing the organic binder into water. Moreover, in the drying step, by drying the mat-like material containing the emulsion, liquid ingredient in the emulsion is evaporated. As a result, the organic binder is attached to a surface and inside and the like of the mat-like material, and the holding and sealing material is obtained.

Furthermore, in the manufacturing method of the holding and sealing material of the preferred embodiment of the present invention, an organic binder with a low glass transition point Tg (° c) of less than or equal to 5° C. is used as the organic binder. Therefore, the organic binder attached to the holding and sealing material can exhibit high motility rubbery state at room temperature (e.g. temperature which is equal to or more than glass transition point of the organic binder). Accordingly, at a time of mounting the holding and sealing material in the catalyst carrier and the shell, the organic binder can combine the inorganic fibers each other of the mat-like material and also can exhibit excellent extensity, and it is possible to absorb damage such as a shock or the like given to the holding and sealing material. Thus, it is possible to suppress a break of the inorganic fibers of the holding and sealing material, and to prevent the inorganic fibers from flying in all directions from the holding and sealing material. Therefore, the workers can comfortably work without wearing the antidust mask or the like and it is possible to keep the working environment of the working area for the mounting work good.

As described above, in the holding and sealing material obtained by the manufacturing method of the preferred embodiment of the present invention, the organic binder can suppress a break of the inorganic fibers of the mat-like material and can hold the inorganic fibers. Therefore, the holding and sealing material can prevent the inorganic fibers from flying in all directions without increasing an amount of an organic binder.

According to the preferred embodiment of the present invention, there is provided a holding and sealing material which is configured to be set between a catalyst carrier and a shell covering the outside of the catalyst carrier in a catalytic converter for purifying an exhaust gas comprising:

a mat-like material formed by arranging inorganic fibers in a mat shape; and an organic binder with a glass transition point Tg (° c) of less than or equal to approximately 5° C. which is attached to the mat-like material.

In the holding and sealing material of the preferred embodiment of the present invention, the organic binder with the glass transition point Tg (° c) of less than or equal to approximately 5° C. is attached to the mat-like material.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

Figure 1:
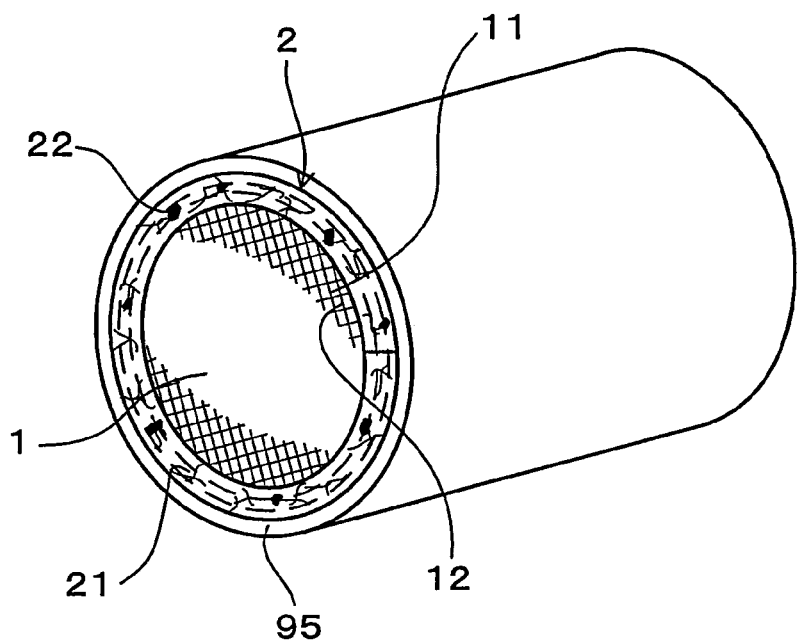
FIG. 1 is a perspective view which shows a state of mounting a holding and sealing material in a catalyst carrier and a shell, in accordance with an embodiment 1.

Next, detailed description of a preferred embodiment of the present invention is described.

In the preferred embodiment of the present invention, by conducting the infiltrating step and the drying step, the holding and sealing material can be manufactured. In the infiltrating step, the mat-like material formed by arranging inorganic fibers in a mat shape is infiltrated with emulsion made by dispersing the organic binder into water.

As an organic binder, the one with the glass transition point Tg (° c) of less than or equal to approximately 5° C. is employed. In the case the glass transition point Tg (° c) exceeds approximately 5° C., it is impossible that the organic binder adequately suppresses a break of the inorganic fibers of the mat-like material at a time of mounting the holding and sealing material, and there is a risk that a part of the inorganic fibers flies in all directions in the air while at assembling work.

In addition, it is preferable that the glass transition point Tg (° c) of the organic binder is equal to or more than approximately −20° C. In the case glass transition point Tg (° c) is more than approximately −20° C., the organic binder is hardly to exude outside from the holding and sealing material at the mounting work, and there is almost no risk that the working environment around the mounting jig or the like is polluted by the organic binder.

It is preferable that the organic binder is a rubber on which is not conducted a crosslinking process.

In this case, in the infiltrating step, the organic binder is easy to adapt to a surface of the mat-like material, and it is possible to equally infiltrate a surface of the inorganic fibers of the mat-like material with the emulsion. Accordingly, in the drying step, the organic binder is attached almost equally on the surface or inside of the mat-like material, it is possible to suppress a flying ratio more of the inorganic fibers from the holding and sealing material.

As the organic binder, for example, acrylic based rubber, styrene-butadiene rubber (SBR), acrylate based rubber, methacrylate based rubber or the like can be employed.

It is preferable that the organic binder is an acrylate based rubber or a methacrylate based rubber.

In this case, it is possible that the organic binder is more equally attached on the surface or the like of the inorganic fibers of mat-like material. In addition, the elongation of the organic binder becomes better after the drying step, and it is possible to prevent the fibers from being tied up constrainedly. Therefore, it is possible to prevent the inorganic fibers from breaking at a time of mounting in the catalyst carrier and the shell, and to prevent the inorganic fibers from flying in all directions further.

It is preferable that the emulsion has a surface tension of less than or equal to approximately 60 mN/M at the room temperature.

In the case a surface tension of the emulsion is less than or equal to approximately 60 mN/M, the emulsion is easy to adapt to a surface of the mat-like material, and thus, organic binder is easily to be attached equally in the mat-like material. In addition, if surface tension is too low, it is difficult to hold the emulsion in the mat-like material at the time of impregnation of the emulsion. Therefore, surface tension of the emulsion should be equal to or more than approximately 20 mN/m.

The emulsion with less than or equal to approximately 60 mN/m of surface tension can be manufactured by, for example, using rubber on which is not conducted a crosslinking process as described above.

Surface tension of the emulsion can be measured, for example, by a ring method.

In the ring method, surface tension is measured by pulling a ring of a metal plate which is hung from a hopper out through liquid surface of the emulsion. When the ring is soaked in the emulsion and pulling the ring out at a crawl, film of the emulsion is attached to the ring. When pulling the ring up to some height, the film of the emulsion cannot bear and then it is cut off. Elongation of hopper, weight of the emulsion and length of film or the like at the moment derive a surface tension.

It is preferable that the emulsion has an emulsion particle diameter of less than or equal to approximately 300 nm.

In the case, the emulsion particle diameter is less than or equal to approximately 300 nm, in the infiltrating step, it is easy to infiltrate the surface of the mat-like material with the emulsion. More preferably, the emulsion particle diameter is not greater than approximately 150 nm, and much more preferably, not greater than approximately 100 nm.

The emulsion particle diameter can be measured by evaluating average value of the particle diameter of, for example, 100 pieces of the emulsion by measured by using a transmission electron microscope.

Next, in the drying step, by drying the mat-like material containing the emulsion, the organic binder is attached to the mat-like material and then the holding and sealing material is manufactured.

In the drying step, it is preferable that the mat-like material containing the emulsion is dried with heating and pressing.

In this case, it is possible to easily remove extra moisture from the mat-like material. In addition, in this case, it is possible to obtain the holding and sealing material of compressed state through the use of the adhesion force of the organic binder. By making the holding and sealing material a compressed state like this, it is possible to perform the mounting of the holding and sealing material in the catalyst carrier and the shell.

Further, by supplying exhaust gas to the catalytic converter for purifying an exhaust gas using the holding and sealing material of compressed state, it is possible that the organic binder included in the holding and sealing material is burned off by heat. As a result, since the holding and sealing material which was compressed restores to its former state, it is possible that the holding and sealing material is held strongly between the catalyst carrier and the shell.

It is preferable that the drying step is conducted under the temperature between approximately 95 to 155° C.

In the case the drying temperature is equal to or greater than 95° C., there is almost no risk that the drying time gets longer and manufacturing efficiency decreases. On the other hand, in the case the drying temperature is lower than or equal to 155° C., there is almost no risk that dissolution of the organic binder starts and the adhesion property of the organic binder is spoiled. In addition, it is preferable that the drying time is equal to or more than 100 minutes. If the drying time is more than 100 minutes, enough drying is performed easily.

In addition, it is preferable that compression is performed under the compression interval of 4 to 15 mm.

In the case the compression interval is equal to or longer than approximately 4 mm, damage of the inorganic fibers hardly occurs. On the other hand, in the case the compression interval is smaller than or equal to approximately 15 mm, it is easy to obtain the above described effect by the compression sufficiently.

Further, as described above, in the case self-crosslinking rubber which is not performed crosslinking process is used as the organic binder, crosslinking reaction of the organic binder can be proceeded by heating at the drying step. However, when the crosslinking reaction is too proceeded, there is a risk that extensity of the organic binder is spoiled. Therefore, in the drying step, it is preferable to making the crosslinking degree of the organic binder lower than or equal to approximately 70%. Since the crosslinking degree of the organic binder is varies, for example, by composition or the like of the organic binder, the organic binder whose final the crosslinking degree after the drying step is less than or equal to approximately 70% can be chosen.

The crosslinking degree of the organic binder can be measured, for example, by gel content measurement method.

More specifically, when the solid organic binder is dissolved into a organic solvent such as toluene, tetrahydrofuran, and methyl ethyl ketone, a part of the solid organic binder does not dissolve and solid content is made in the organic solvent. At this time, assuming a weight of the organic binder before feeding into the organic solvent is $W_a$ and assuming a weight of the solid content generated in the organic solvent is $W_b$, the crosslinking degree L can be calculated by the mathematical formula of $L=W_b/W_a \times 100$.

In addition, attached ratio of the organic binder in the holding and sealing material is preferably in the range of 0.5 wt % to 1.5 wt %.

In the case the attached ratio is equal to or more than approximately 0.5 wt percent, it is easy to prevent the inorganic fibers fully from flying in all directions from a surface of the holding and sealing material. On the other hand, in the case the attached ratio is less than or equal to approximately 1.5 wt percent, amount of the organic binder increases such that there is almost no risk that the poisonous gas such as nonmethane hydrocarbons, nitrogen oxide or the like might be occurred from the holding and sealing material.

In addition, in between the infiltrating step and the drying step, it is possible to conduct a solid content removal step for removing extra solid content of the organic binder attached in the mat-like material. By this step, the extra solid content of the organic binder attached more than necessary in the mat-like material can be removed in the infiltrating step. A solid content removal step can be conducted, for example, by suction or the like.

Next, the second aspect of the present invention is described.

In the second aspect of the present invention, the holding and sealing material is comprised by attaching the organic binder into the mat-like material which is formed by arranging the inorganic fibers in a mat shape.

As the mat-like material, the material similar to the one in the first aspect of the present invention can be used.

As the organic binder, the one with a glass transition point Tg (° c) of less than or equal to 5° C. is employed. The reason for the critical point is similar to the one in the first aspect of the present invention and it is preferable that the glass transition Tg of the organic binder is equal to or more than −20° C.

As the organic binder, as same as the first aspect of the present invention, for example, acrylic based rubber, styrene-butadiene rubber (SBR), acrylate based rubber, methacrylate based rubber or the like can be employed.

It is preferable that the organic binder is an acrylate based rubber or a methacrylate based rubber.

In this case, the elongation of the organic binder becomes better and it is possible to prevent the fibers from being tied up constrainedly. Therefore, it is possible to prevent the inorganic fibers from breaking at a time of mounting in the catalyst carrier and the shell, and to prevent the inorganic fibers from flying in all directions further.

It is preferable that a flying ratio of the inorganic fibers is less than or equal to 0.15 wt %.

In this case, it is possible to securely prevent the inorganic fibers from flying in all directions from the holding and sealing material, and the mounting work of the holding and sealing material is comfortably conducted. A flying ratio of the inorganic fibers is more preferably less than or equal to 0.10 wt %

The flying ratio of the inorganic fibers can be defined by a pace of decrease of weight when a device according to Japanese Industrial Standards K6830-1996•26 low temperature resistant test•26.2 test device (4) impact testing machine is used.

This pace of decrease of weight a [wt %] is expressed as $\alpha=((W_0-W)/W_0) \times 100$ [wt %] assuming the weight of the holding and sealing material (sample size: 100 mm×100 mm) before impact test is $W_0$ and the one after impact test is W.

It is preferable that the crosslinking degree of the organic binder attached in the holding and sealing material is less than or equal to approximately 70%.

In the case the crosslinking degree is less than or equal to approximately 70%, extensity of the organic binder is lowered and there is almost no risk that the prevention effect for the flying of the inorganic fibers from the holding and sealing material is reduced.

[Embodiments]
(Embodiment 1)

Next, the holding and sealing material relates to the embodiment in the present invention is explained with FIG. 1 to FIG. 4.

Figure 2:
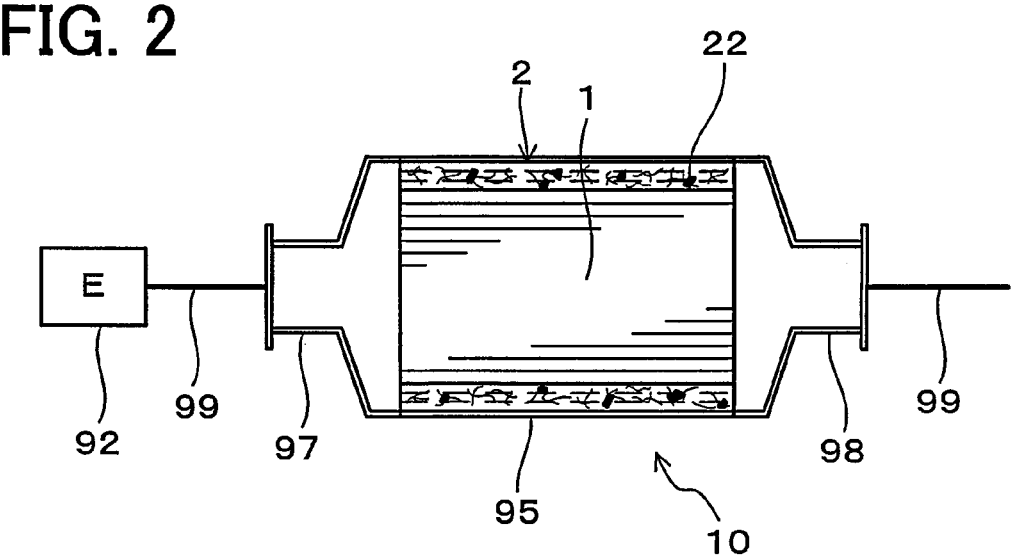
FIG. 2 is an explanatory drawing which shows a state of setting a catalytic converter for purifying an exhaust gas built-in a holding and sealing material in the middle of the exhaust pipe of the engine, in accordance with the embodiment 1.

As shown in FIG. 1 and FIG. 2, the holding and sealing material 2 of the present embodiment is used as being disposed on between the catalyst carrier 1 and the shell 95 which covers outer of the catalyst carrier 1 in the catalytic converter for purifying an exhaust gas 10. In the holding and sealing material 2, the mat-like material is formed by arranging the inorganic fibers in mat shape, and the organic binder 22 with the glass transition point Tg (° c) of less than or equal to 5° C. is attached to the mat-like material 21 (refer to FIGS. 3(A) and (B)).

Details are described below.

As the catalyst carrier 1, a cordierite carrier whose a transverse sectional surface is formed in a honeycomb shape. A lot of rectangular holes 11 are provided along an axial direction in this catalyst carrier 1. Further, a lot of honeycomb walls 12 which is the partition walls of the rectangular holes 11 are formed between the rectangular holes 11 (refer to FIG. 1). Further, a catalyst mainly composed of a platinum or a palladium is supported on the catalyst carrier 1.

Further, as the inorganic fibers constituting the mat-like material 21, crystalline alumina fibers which is non-expansible fibers arranged so as not to expand so much by heat.

Next, a manufacturing method of the holding and sealing material of the present embodiment is explained.

In the manufacturing method of the holding and sealing material of the present embodiment, the infiltrating step and the drying step are conducted. In the infiltrating step, the emulsion made by dispersing the organic binder 22 into water is infiltrated into the mat-like material 21 formed by arranging inorganic fibers in a mat shape. Moreover, in the drying step, the holding and sealing material 2 is obtained by attaching the organic binder 22 to the mat-like material 21 by means of drying the mat-like material 21 containing the emulsion. As the organic binder, the one with a glass transition point Tg (° c) of less than or equal to 5° C. is used. In addition, in the present invention, a solid content removal step for removing extra solid content of the organic binder 22 attached in the mat-like material 21 is conducted in between the infiltrating step and the drying step.

Details are explained for the manufacturing method of a holding and sealing material of the present embodiment.

First, the mat-like material 21 with dimensions of lengthwise 500 to 1400 mm×crosswise 51,000 to 52,500 mm, and thickness 1.5 to 12 m was prepared.

Next, the mat-like material 21 was infiltrated with the emulsion containing the organic binder.

As the emulsion, acrylonitrile-butadiene copolymer latex (the emulsion particle diameter: 50 nm, the glass transition point of the organic binder: −21° C., the density of the organic binder: 1 wt %) made by dispersing acrylonitrile-butadiene copolymer rubber to water was prepared. This emulsion was infiltrated by pouring method into the mat-like material 21 set on the conveyer.

Next, suction for equal to or more than 1 minute was conducted to remove solid content of the extra organic binder attaching to the mat-like material 21. After the suction, when the impregnated rate of the emulsion was measured by weighing instrument, the emulsion 22 of 100 parts by weight was impregnated against the mat-like material 21 of 100 parts by weight.

After that, heating, compressing, and drying of the mat-like material 21 was conducted. Heating, compressing, and drying was conducted under the condition of temperature of 95 to 155° C., drying time of equal to or more than 100 minutes, and interval pressurisation at the time of drying of 4 to 15 mm.

By this means, the holding and sealing material 2 with the attached rate of the organic binder of 1.0 wt % and thickness of 3 to 15 mm was obtained. By the way, in relation to the holding and sealing material 2 manufactured in the present embodiment, it is possible to be adjusted to the required size and shape by punching or the like.

Next, mounting method of the holding and sealing material is explained.

First, the catalyst was supported on the catalyst carrier 1 in advance.

Figure 3:
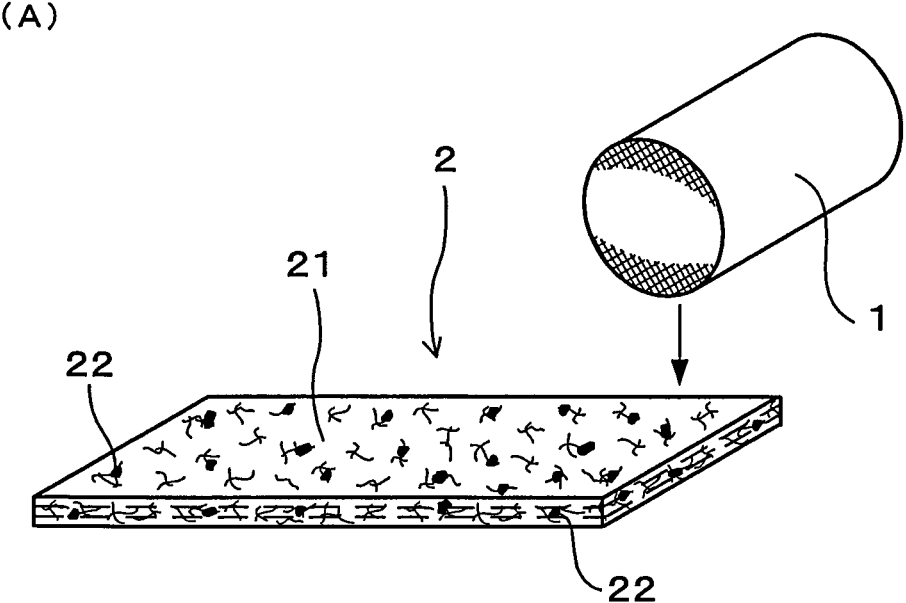
FIG. 3 is an explanatory drawing which (A) shows a state prior to winding the holding and sealing material around the catalyst carrier and (B) shows a state of winding the holding and sealing material around the catalyst carrier, in accordance with the embodiment 1.
Figure 3:
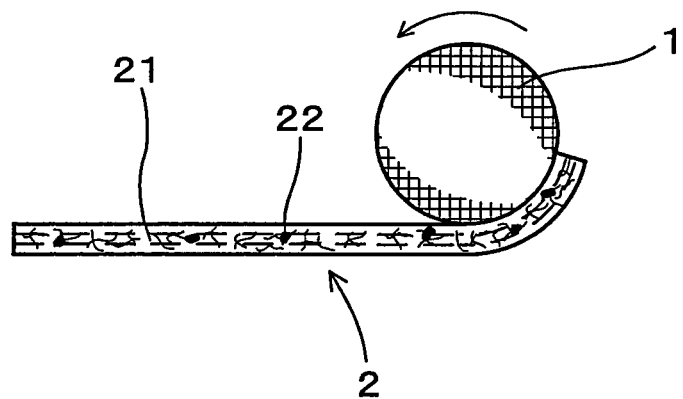
Figure 4:
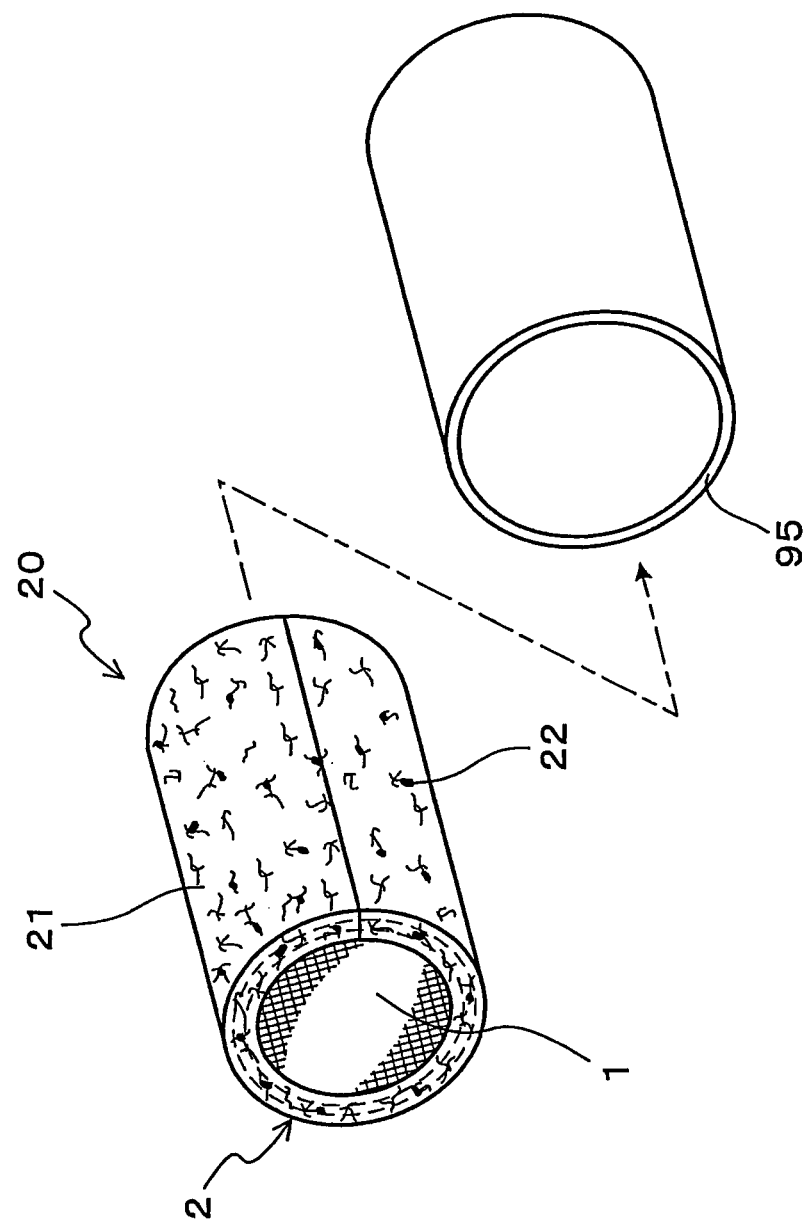
FIG. 4 is an explanatory drawing which shows a state of setting a unit formed by winding the holding and sealing material around the catalyst carrier within the shell, in accordance with the embodiment 1.
Figure 5:
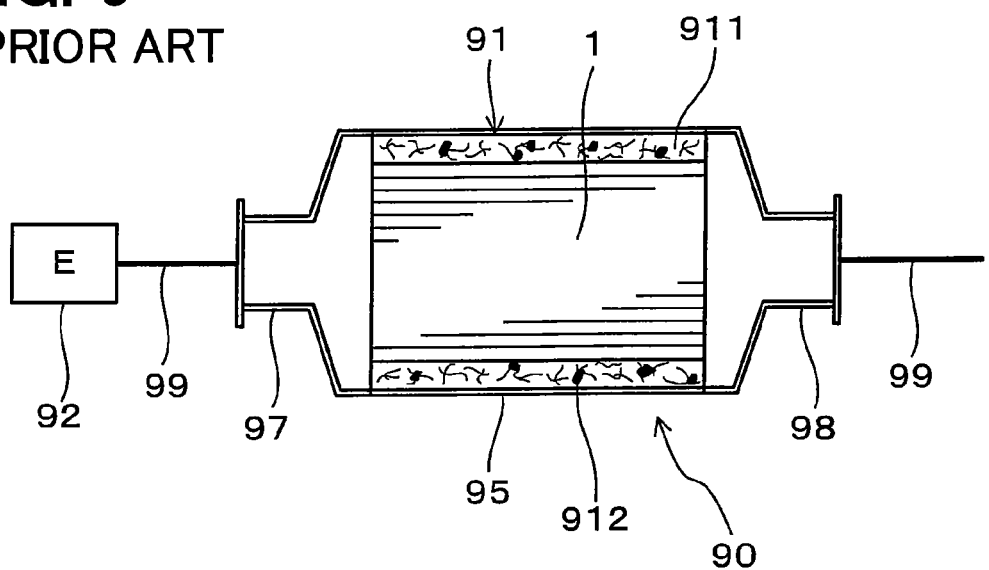
FIG. 5 is an explanatory drawing which shows a state of setting a conventional catalytic converter for purifying an exhaust gas assembled in the middle of the exhaust pipe of the engine.

Next, the holding and sealing material 2 was wound (refer to FIGS. 3 (A) and (B)) onto the catalyst carrier 1 and the wound unit 20 was set into the inside of the shell 95 (refer to FIG. 4). By this means, mounting of the holding and sealing material 2 was conducted, an inlet connection 97 and an outlet connection 98 were respectively connected to the both ends of the shell 95 by welding (refer to FIG. 2).

In addition, the catalytic converter for purifying an exhaust gas 10 manufactured by this means can be used by setting in the midstream of a pipe for exhaust gas discharged by an engine.

Next, operation and effect of the present embodiment is explained.

In the present embodiment, as the organic binder 22 infiltrated to the holding and sealing material 2, the one with glass transition point Tg (° c) of less than or equal to 5° C. is used (refer to FIG. 1).

Thus, the organic binder 22 attached to the holding and sealing material 2 can exhibit the rubber state with high motility at room temperature. Thus, at the time of mounting the holding and sealing material 2 in the catalyst carrier 1 and the shell 95, the organic binder exhibits an excellent extensity and making it possible to absorb damages such as impacts or the like given to the inorganic fibers of the holding and sealing material 2.

Therefore, it is possible to suppress a break of the inorganic fibers of the holding and sealing material, and to prevent the inorganic fibers from flying in all directions from the holding and sealing material. Accordingly, the workers can comfortably work without wearing the antidust mask or the like and it is possible to keep the working environment of working area for the amounting work good.

(Embodiment 2)

In the present embodiment, a drop test was conducted as described below in order to make sure of difficulty of flying the inorganic fibers contained in the holding and sealing material in all directions in the air.

Specifically, as well as embodiment 1, a plural number of holding and sealing materials (sample E1 to sample E4, sample C1 to sample C4) was manufactured by using the emulsion containing the organic binders having different glass transition point (Tg). And then, they were dropped from the specific height and difficulty of flying the inorganic fibers in all directions in the air at this time was evaluated.

To be more precise, eight kinds of holding and sealing material which are sample E1 to sample E4 and sample C1 to sample C4 were manufactured.

Sample E1 was manufactured by infiltrating with acrylonitrile-butadiene copolymer latex (the glass transition point Tg of the organic binder: −21° C., the emulsion particle diameter: 50 nm, the density of the organic binder: about 1 wt %) made by dispersing acrylonitrile-butadiene copolymer rubber into water as the emulsion, and then, by conducting suction, heating, compressing, and drying as well as embodiment 1. Thus, the holding and sealing material in sample E1 is the same as the one in embodiment 1.

Sample E2 was manufactured by infiltrating with denatured acrylic ester copolymer latex (the glass transition point Tg of the organic binder: −5° C., the emulsion particle diameter: 80 nm, the density of the organic binder: about 1 wt %) made by dispersing denatured acrylic ester copolymer rubber into water as the emulsion, and then, by conducting suction, heating, compressing, and drying as well as embodiment 1.

Furthermore, sample E3 is manufactured by infiltrating with denatured acrylic ester copolymer latex (the glass transition point Tg of the organic binder: 1° C., the emulsion particle diameter: 110 nm, the density of the organic binder: about 1 wt %), and then, by conducting suction, heating, compressing, and drying as well as embodiment 1.

Furthermore, sample E4 is manufactured by infiltrating with denatured acrylic ester copolymer latex (the glass transition point Tg of the organic binder: −10° C., the emulsion particle diameter: 260 nm, the density of the organic binder: about 1 wt %), and then, by conducting suction, heating, compressing, and drying as well as embodiment 1.

In addition, sample C1 is manufactured by infiltrating with acrylonitrile-butadiene-styrene three dimension copolymer latex (the glass transition point Tg of the organic binder: 26° C., the emulsion particle diameter: 40 nm, the density of the organic binder: about 1 wt %) made by dispersing acrylonitrile-butadiene-styrene three dimension copolymer rubber into water as the emulsion, and then, by conducting suction, heating, compressing, and drying as well as embodiment 1.

In addition, sample C2 is manufactured by infiltrating with denatured styrene-butadiene copolymer latex (glass transition point Tg of the organic binder: 12° C., the emulsion particle diameter: 80 nm, density of the organic binder: about 1 wt %) made by dispersing denatured styrene-butadiene copolymer rubber into water as the emulsion, and then, by conducting suction, heating, compressing, and drying as well as embodiment 1.

Furthermore, sample C3 is manufactured by infiltrating with denatured styrene-butadiene copolymer latex (glass transition point Tg of the organic binder: 20° C., the emulsion particle diameter: 160 nm, density of the organic binder: about 1 wt %), and then, by conducting suction, heating, compressing, and drying as well as embodiment 1.

Furthermore, sample C4 is manufactured by infiltrating with denatured acrylic ester copolymer latex (the glass transition point Tg of the organic binder: 25° C., the emulsion particle diameter: 110 nm, the density of the organic binder: about 1 wt %), and then, by conducting suction, heating, compressing, and drying as well as embodiment 1.

In the holding and sealing material of the sample E1 to sample E4 and sample C1 to sample C4, the organic binder of approximately 1.0 wt % was attached to the mat-like material as is the case with the embodiment 2.

Next, impact test on each sample (sample E1 to sample E4 and sample C1 to sample C4) was conducted.

In this impact test, impact was given to each samples (sample size: 100 mm×100 mm) by using a device according to Japanese Industrial Standards K6830-1996•26 low temperature resistant test•26.2 test device (4) impact testing machine. The impact test was conducted on the condition of angle of impact 90 and number of impact 1 time. In respect of the holding and sealing material of each samples, pace of decrease in weight before and after the impact test (flying ratio) were measured. The result is shown in the Table 1.

By the way, this pace of decrease of weight α [wt %] is expressed as $\alpha = ((W_0 - W)/W_0) \times 100$ [wt %] assuming the weight of the holding and sealing mate material (sample size: 100 mm×100 mm) before impact test is $W_0$ and the one after impact test is W.

TABLE 1

| Sample No. | elastomer king | Tg (° C.) | particle diameter of emulsion (nm) | flying ratio (wt %) |
|---|---|---|---|---|
| E1 | acrylonitrile-butadiene copolymer rubber | −21 | 50 | 0.089 |
| E2 | denatured acrylic ester copolymer rubber | −5 | 80 | 0.04 |
| E3 | denatured acrylic ester copolymer rubber | 1 | 110 | 0.079 |
| E4 | denatured acrylic ester copolymer rubber | −10 | 260 | 0.116 |
| C1 | acrylonitrile-butadiene-styrene three dimension copolymer rubber | 26 | 40 | 0.261 |
| C2 | denatured styrene-butadiene copolymer rubber | 12 | 80 | 0.205 |
| C3 | denatured styrene butadiene copolymer rubber | 20 | 160 | 0.265 |
| C4 | denatured acrylic ester copolymer rubber | 25 | 110 | 0.167 |

As shown by Table 1, the holding and sealing material of sample E1 to sample E4 manufactured by using the emulsion containing the organic binder with low glass transition point Tg shows very low flying ratio of more than 0.116 wt % at the maximum. On the other hand, the holding and sealing material of sample C1 to sample C4 manufactured by using the emulsion containing the organic binder with high glass transition point Tg shows high flying ratio. This is because the organic binder shows the rubber state with high motility at room temperature and exhibits excellent extensity, and impacts given to the inorganic fibers of the holding and sealing material can be sufficiently absorbed in the sample E1 to sample E4.

By the way, though there is not a clear description in Table 1, it is confirmed that sufficiently low flying ratio (for example equal to or less than 0.15 wt %) enough to conduct mounting work of the holding and sealing material comfortably can be obtained in the case the holding and sealing material is manufactured by using the emulsion containing the organic binder with equal to or less than 5° C. in glass transition point Tg.

Furthermore, in sample E1 to sample E4 and sample C1 to sample C4, small amount of about 1.0 wt % of the organic binder is attached. Sample E1 to sample E4 can exhibits low flying ratio as described above even if such as a small amount of the organic binder is used. Accordingly, sample E1 to sample E4 is safe for the environment and it is possible to sufficiently prevent the inorganic fibers from flying in all directions at the time of handling.

The contents of JP 2003-105658 and Japanese Industrial Standards K6830-1996•26 are incorporated herein by reference.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A method of manufacturing a holding and sealing material for a catalytic converter, comprising:

preparing an emulsion comprising water and a self-crosslinking rubber organic binder on which a crosslinking process is not conducted, the organic binder having a glass transition point Tg (° C.) in a range of −21 to 5° C. and being dispersed into the water such that an emulsion particle diameter of the organic binder is in a range of 50 to 260 nm;

infiltrating a material comprising inorganic fibers formed into a mat shape with the emulsion such that the inorganic fibers of the material is impregnated with the emulsion; and drying by heating and pressing the material impregnated with the emulsion such that the organic binder is attached to the inorganic fibers of the material, with an attached ratio of the organic binder in the holding and sealing material being in the range of 0.5 wt % to 1.5 wt %, wherein said drying causes a crosslinking reaction of the organic binder and is conducted under conditions which result in a crosslinking degree L of the rubber organic binder being lower than or equal to approximately 70%, wherein the crosslinking degree L can be calculated by a mathematical formula of $L=(W_b/W_a) \times 100$ with $W_a$ being a weight of the organic binder before feeding into an organic solvent and $W_b$ being a weight of a solid content generated in the organic solvent.

2. The method of manufacturing a holding and sealing material as claimed in claim 1, further comprising removing solid content of the organic binder attached to the inorganic fibers, said removing being performed between said infiltrating and said drying.

3. The method of manufacturing a holding and sealing material as claimed in claim 2, wherein said removing comprises a suction process.

4. The method of manufacturing a holding and sealing material as claimed in claim 1, wherein said preparing an emulsion comprises using an organic binder having a glass transition point Tg of approximately −5° C. dispersed into the water such that an emulsion particle diameter of the organic binder is approximately 80 nm.

5. The method of manufacturing a holding and sealing material as claimed in claim 4, wherein said drying results in said attached ratio being approximately 1 wt %, said method further comprising:

performing a suction process to remove solid content of the organic binder attached to the inorganic fibers, the suction process being performed after said infiltrating and before said drying; and performing said drying such that a flying ratio of the inorganic fibers is less than or equal to 0.15 wt %.

6. The method of manufacturing a holding and sealing material as claimed in claim 1, wherein said preparing an emulsion comprises using an organic binder having a glass transition point Tg of approximately 1° C. dispersed into the water such that an emulsion particle diameter of the organic binder is approximately 110 nm.

7. The method of manufacturing a holding and sealing material as claimed in claim 6, wherein said drying results in said attached ratio being approximately 1 wt %, said method further comprising:

performing a suction process to remove solid content of the organic binder attached to the inorganic fibers, the suction process being performed after said infiltrating and before said drying; and performing said drying such that a flying ratio of the inorganic fibers is less than or equal to 0.15 wt %.

8. The method of manufacturing a holding and sealing material as claimed in claim 1, wherein said preparing an emulsion comprises using an organic binder having a glass transition point Tg of approximately −10° C. dispersed into the water such that an emulsion particle diameter of the organic binder is approximately 260 nm.

9. The method of manufacturing a holding and sealing material as claimed in claim 8, wherein said drying results in said attached ratio being approximately 1 wt %, said method further comprising:

performing a suction process to remove solid content of the organic binder attached to the inorganic fibers, the suction process being performed after said infiltrating and before said drying; and performing said drying such that a flying ratio of the inorganic fibers is less than or equal to 0.15 wt %.

10. The method of manufacturing a holding and sealing material as claimed in claim 1, wherein the organic binder is an acrylate based rubber or a methacrylate based rubber.

11. The method of manufacturing a holding and sealing material as claimed in claim 1, wherein the emulsion has a surface tension of less than or equal to approximately 60 mN/M at the room temperature.

12. The method of manufacturing a holding and sealing material as claimed in claim 1, wherein the drying is conducted in a temperature ranging between approximately 95 to 155° C.

13. The method of manufacturing a holding and sealing material as claimed in claim 1, further comprising compressing the material in a compression interval of 4 to 15 mm.

14. The method of manufacturing a holding and sealing material as claimed in claim 1, wherein the emulsion has a surface tension of less than or equal to approximately 60 mN/M at the room temperature and equal to or more than approximately 20 mN/M at the room temperature.

15. The method of manufacturing a holding and sealing material as claimed in claim 1, wherein the inorganic fibers are crystalline alumina fibers.

16. The method of manufacturing a holding and sealing material as claimed in claim 1, wherein the organic binder attached to the inorganic fibers of the material suppresses breaking and flying of the inorganic fibers during assembly of the catalytic converter.

17. A method of manufacturing a holding and sealing material for a catalytic converter, comprising:

preparing an emulsion comprising water and a self-crosslinking rubber organic binder on which a crosslinking process is not conducted, the organic binder having a glass transition point Tg (° C.) of −21° C. and being dispersed into the water such that an emulsion particle diameter of the organic binder is 50 nm;

infiltrating a material comprising inorganic fibers formed into a mat shape with the emulsion such that the inorganic fibers of the material is impregnated with the emulsion; and drying by heating and pressing the material impregnated with the emulsion such that the organic binder is attached to the inorganic fibers of the material, with an attached ratio of the organic binder in the holding and sealing material being in the range of 0.5 wt % to 1.5 wt %, wherein said drying causes a crosslinking reaction of the organic binder and is conducted under conditions which result in a crosslinking degree L of the rubber organic binder being lower than or equal to approximately 70%, wherein the crosslinking degree L can be calculated by a mathematical formula of $L=(W_b/W_a)\times 100$ with $W_a$ being a weight of the organic binder before feeding into an organic solvent and $W_b$ being a weight of a solid content generated in the organic solvent.

18. The method of manufacturing a holding and sealing material as claimed in claim 17, wherein said drying results in said attached ratio being approximately 1 wt %, said method further comprising:
   performing a suction process to remove solid content of the organic binder attached to the inorganic fibers, the suction process being performed after said infiltrating and before said drying; and
   performing said drying such that a flying ratio of the inorganic fibers is less than or equal to 0.15 wt %.

\* \* \* \* \*